United States Patent
Mohanarajah et al.

(10) Patent No.: US 12,552,033 B2
(45) Date of Patent: Feb. 17, 2026

(54) AUTOMATED STORAGE AND RETRIEVAL SYSTEM

(71) Applicant: Rapyuta Robotics Co., Ltd., Tokyo (JP)

(72) Inventors: Gajamohan Mohanarajah, Tokyo (JP); Arudchelvan Krishnamoorthy, Tokyo (JP)

(73) Assignee: RAPYUTA ROBOTICS CO., LTD., Tokyo (JP)

( * ) Notice: Subject to any disclaimer, the term of this patent is extended or adjusted under 35 U.S.C. 154(b) by 353 days.

(21) Appl. No.: 18/165,938

(22) Filed: Feb. 8, 2023

(65) Prior Publication Data

US 2023/0278795 A1 Sep. 7, 2023

Related U.S. Application Data

(60) Provisional application No. 63/482,805, filed on Feb. 2, 2023, provisional application No. 63/315,563, filed on Mar. 2, 2022.

(51) Int. Cl.
| | |
|---|---|
| *B65G 1/04* | (2006.01) |
| *B25J 9/16* | (2006.01) |
| *B25J 13/00* | (2006.01) |
| *B65G 1/06* | (2006.01) |
| *B65G 1/10* | (2006.01) |
| *B65G 1/127* | (2006.01) |

(Continued)

(52) U.S. Cl.
CPC ............. *B25J 9/1674* (2013.01); *B25J 9/161* (2013.01); *B25J 9/1676* (2013.01); *B25J 13/006* (2013.01); *B65G 1/0471* (2013.01); *B65G 1/0478* (2013.01); *B65G 1/0492* (2013.01); *B65G 1/06* (2013.01); *B65G 1/065* (2013.01);

(Continued)

(58) Field of Classification Search
CPC .......................... B65G 1/0492; A47B 47/0091
See application file for complete search history.

(56) References Cited

U.S. PATENT DOCUMENTS

| | | | |
|---|---|---|---|
| 6,652,213 B1 * | 11/2003 | Mitchell | B65G 1/0492 |
| | | | 414/284 |
| 7,381,022 B1 * | 6/2008 | King | B65G 1/1375 |
| | | | 414/807 |

(Continued)

FOREIGN PATENT DOCUMENTS

| | | |
|---|---|---|
| JP | 06-024506 A | 2/1994 |
| JP | 2017-522247 A | 8/2017 |

(Continued)

OTHER PUBLICATIONS

International Search Report and Written Opinion mailed on Apr. 4, 2023 in the PCT Application No. PCT/JP2023/006764.

*Primary Examiner* — Jonathan Snelting

(74) *Attorney, Agent, or Firm* — Trupti P. Joshi

(57) ABSTRACT

The present disclosure relates to an automated storage and retrieval system. The system comprises a multi-floor storage structure defined with a storage space in each floor of the multi-floor storage structure. The system includes a plurality of storage bins arranged in the storage space and is configured to store inventory. Further, there is at least one autonomous vehicle configured to move under and transport the at least one storage bin of the plurality of storage bins and is configured to transport the plurality of storage bins within each floor and across multiple floors of the multi-floor storage structure.

20 Claims, 10 Drawing Sheets

(51) Int. Cl.
    *B65G 1/137* (2006.01)
    *B25J 5/00* (2006.01)

(52) U.S. Cl.
    CPC .............. *B65G 1/10* (2013.01); *B65G 1/127* (2013.01); *B65G 1/1371* (2013.01); *B65G 1/1373* (2013.01); *B65G 1/1378* (2013.01); *B25J 5/007* (2013.01); *B65G 2201/0235* (2013.01); *B65G 2201/0258* (2013.01); *B65G 2203/0233* (2013.01); *B65G 2203/0283* (2013.01); *B65G 2811/0678* (2013.01)

(56) References Cited

U.S. PATENT DOCUMENTS

| | | | |
|---|---|---|---|
| 9,020,632 B2 * | 4/2015 | Naylor | B65G 1/0492 |
| | | | 414/277 |
| 9,854,906 B1 * | 1/2018 | Ke | A47B 47/0083 |
| 10,080,437 B1 * | 9/2018 | Tang | A47B 47/0091 |
| 12,256,836 B2 * | 3/2025 | Keller | F16B 12/10 |
| 2016/0009493 A1 | 1/2016 | Corp | |
| 2017/0267452 A1 | 9/2017 | Ltd | |
| 2021/0155410 A1 * | 5/2021 | Takai | B65G 1/1375 |
| 2021/0221615 A1 | 7/2021 | At | |
| 2022/0106122 A1 | 4/2022 | Ltd | |

FOREIGN PATENT DOCUMENTS

| | | | | |
|---|---|---|---|---|
| JP | 2018-516824 A | 6/2018 | | |
| WO | WO 2021/122218 A1 | 6/2021 | | |
| WO | WO-2021105197 A1 * | 6/2021 | ............. | F16B 12/10 |
| WO | WO 2021/218931 A1 | 11/2021 | | |

* cited by examiner

AUTOMATED STORAGE AND RETRIEVAL SYSTEM

CROSS-REFERENCE TO RELATED APPLICATIONS

The present application claims the benefit of priority to U.S. Provisional Application No. 63/315,563 filed on Mar. 2, 2022, and U.S. Provisional Application No. 63/482,805 filed on Feb. 2, 2023, the contents of each of which are hereby incorporated by reference in their entirety.

TECHNICAL FIELD

The present disclosure generally relates to a warehouse system such as an Automated Storage and Retrieval System (an ASRS or an AS/RS).

BACKGROUND

As Electronic Commerce (EC) markets expand, improvement of item storage efficiency and item picking work efficiency for logistics has become a great problem. In order to resolve this problem, for example, WO2018/189110 A1 discloses a warehouse. This warehouse is partitioned into a storage area 10 and an order preparation area 11. Rack 100 storing trays 102 for containing storage target products are arranged in the storage area 10. On the other hand, order preparation stations 12 for operators 13 to process orders are arranged in the order preparation area 11.

To process an order, an automated device 103 transports the tray 102 containing an order target product from the rack 100 to the order preparation station 12. Subsequently, in the order preparation area 11, the tray 102 is transported to in front of the operator 13 by, for example, another operator other than the operator 13, or another system (e.g., conveyer). The operator 13 picks the product from the tray 102 and sorts the picked product as a transportation package 14. As EC markets expand, it is demanded to make such work more efficient. Furthermore, a structure enabling flexible design of a form of an automated storage and retrieval system at various places at which the automated storage and retrieval system is installed is demanded.

The present disclosure has been made in light of the above problem, and an object of the present disclosure is to provide an automated storage and retrieval system which enable flexible design of a form thereof.

SUMMARY

In order to achieve the above object, according to one aspect of the present disclosure, an automated storage and retrieval system is provided, and the automated storage and retrieval system includes: a multi-floor storage structure defined with a storage space in each floor of the multi-floor storage structure; a plurality of storage bins arranged in the storage space, wherein each of the plurality of storage bins is configured to store inventory; and at least one autonomous vehicle configured to move under and transport the at least one storage bin of the plurality of storage bins and is configured to transport the plurality of storage bins within each floor and across multiple floors of the multi-floor storage structure.

In such automated storage and retrieval system, there are one or more vertical elevators installed in the multi-floor storage structure and is configured to transport the at least one autonomous vehicle with or without the plurality of storage bins vertically across the multiple floors.

Each floor of the multi-floor storage structure is defined with at least one opening and the one or more vertical elevators is configured to traverse through the at least one opening.

Each storage bin of the plurality of storage bins is defined with: a base; a side wall structure extending upwardly from the base; and one or more legs extending downwardly from the base such that the base is elevated from the floor.

The side wall structure and the base define an internal volume to store the inventory.

Each floor of the multi-floor storage structure is built with a plurality of pallets adjoined to each other.

In such automated storage and retrieval system, there are a plurality of support pillars configured to support the plurality of pallets.

Each of the plurality of support pillars comprises: a foot; and an elongated member extending upwardly from the foot and supporting the plurality of pallets across the multiple floors of the multi-floor storage structure.

The elongated member of each of the plurality of support pillars are defined with ridges to connect with the plurality of pallets.

Each pallet of the plurality of pallets is supported by the plurality of support pillars along corners of the pallet.

The one or more vertical elevators comprises: a plate slidably connected to the plurality of support pillars; and a plurality of wheels mounted on the ridges of the plurality of support pillars to facilitate vertical movement of the one or more vertical elevators.

According to another aspect of the present disclosure a method for handling inventory in an automatic storage and retrieval system is disclosed. The method comprising: storing inventory in a plurality of storage bins arranged in a storage space defined in each floor of a multi-floor storage structure; transporting the plurality of storage bins within each floor and across multiple floors of the multi-floor storage structure by at least one autonomous vehicle, wherein at least one autonomous vehicle is configured to move under and transport the at least one storage bin of the plurality of storage bins.

In such method for handling inventory in an automatic storage and retrieval system, there is traversing vertically the at least one autonomous vehicle with or without the plurality of storage bins across the multiple floors by one or more vertical elevators.

DETAILED DESCRIPTION OF EMBODIMENTS

Figure 1:
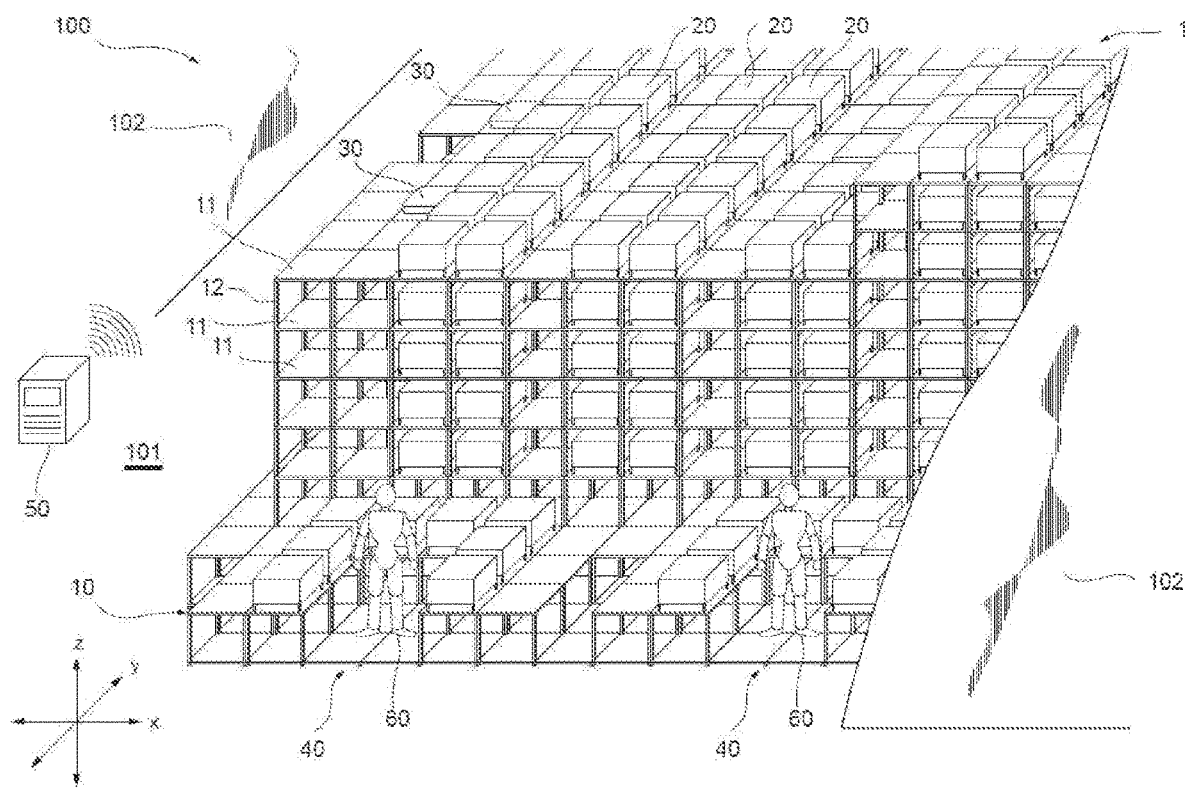
FIG. 1 is a perspective view schematically illustrating an external appearance of an automated storage and retrieval system according to an embodiment of the present disclosure.

Hereinafter, an embodiment of the present disclosure will be described with reference to the accompanying drawings. In all drawings, identical reference numerals are used to refer to identical or similar components. The following embodiment does not intend to limit the invention recited in the claims. Examples and features of the disclosed principal will be described in this description yet can be changed and modified without departing from the idea and the scope of the disclosed embodiment. Furthermore, specific features, structures, or characteristics can be combined by an arbitrary appropriate method in one or more embodiments. The following detailed description is taken into account only as exemplary description, and the true range and idea are intended to be indicated by the claims.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily referring to the same embodiment.

Embodiments of present disclosure provide an automated storage and retrieval system. Typically, storage of items within a warehouse or similar environment requires a large building or storage structure space with an associated footprint. Autonomous vehicles or robots may be used in these warehouses to place items in storage and remove items from storage. On the other hand, in a Goods to Person (GTP) environment, pickers remain at their workstations while a software-driven ASRS retrieves, conveys and delivers required Stock-Keeping Units (SKU) to the order picker's workstation in a designated SKU donor tote or tray. Once the requested number of items has been selected and put into the correct order location, SKU donor totes/trays are returned to the ASRS for put-away. It is advantageous to have an autonomous vehicle that can efficiently pick items for removal from the storage structure and at the same time access multiple storage levels so that a storage density of the storage structure may be increased.

Embodiments of the present disclosure provide an autonomous vehicle-based storage and retrieval system. Storage and retrieval architecture in accordance with some embodiments includes one or more components. The one or more components includes a plurality of storage bins containing the inventory/goods/objects to be retrieved, transported and stored. The system further includes multi-floor storage structure designed to operate in one or more environments, for example, in a multi-floor structure where a plurality of storage bins is arranged. Embodiments of the present disclosure provides a plurality of autonomous vehicles, like robots, to move in and out under the plurality of storage bins. The system further includes vertical elevators to transport the one or more autonomous vehicle with/without the plurality of storage bins across multi-floor storage structure. Furthermore, in a GTP/PTG (Goods to Person/Person to Goods) setup, the present disclosure provides an automated picking or teleoperated picking and dropping of the goods at the picking station. In one embodiment, the ASRS may include two primary segments, namely, stacker crane and a combination of shuffle and evaluator at a fixed position for vertical movement. The ASRS in accordance with present embodiments may be implemented either as stand-alone units or in integrated workstations or systems. These units are usually integrated with various types of pick to light systems and use either a microprocessor controller for basic usage or inventory management software.

Embodiments of the present disclosure provide an improved speed of operation in an ASRS architecture with reduced cost. For example, by splitting the vertical and horizontal motions of an autonomous vehicle carrying bins, each mechanism of transportation, storage and retrieval is simplified and with greater speed and reduced cost. Embodiments of the present disclosure provide a ASRS structure with multi-floors structure with one or more vertical elevators. Herein, elevator poles may be used as pillars supporting the floors to optimize volume utilization.

Embodiments of the present disclosure provide an autonomous vehicle-based storage and retrieval system. A detailed description of the above-described system is shown with respect to illustrations represented with reference to FIGS. 1 through 9B.

FIG. 1 is a perspective view schematically illustrating an external appearance of an automated storage and retrieval system (ASRS) 1 according to an embodiment of the present disclosure. The automated storage and retrieval system 1 is constructed in, for example, a building 100. The building 100 includes a floor surface 101 extending along a horizontal plane, a plurality of sidewalls 102 vertically standing from the floor surface 101, and a ceiling (not illustrated) supported by the plurality of sidewalls 102. For example, the four sidewalls 102 surrounding four sides, and the ceiling extending in parallel to the floor surface 101 establish an internal space between the floor surface 101, and the sidewalls 102 and the ceiling. The automated storage and retrieval system 1 is constructed in this internal space. Note that part of the sidewalls 102 are cut out for ease of description in FIG. 1. In the building 100, an x-axis and a y-axis extending in a direction perpendicular to each other on the horizontal plane, and a z-axis extending in a vertical direction and perpendicular to the x-axis and the y-axis are defined.

The automated storage and retrieval system 1 can automate a series of work from warehousing and storage to delivery of items including products and the like based on centralized management. The automated storage and retrieval system 1 according to the present embodiment includes a multi-floor storage structure 10 arranged on the floor surface 101, a plurality of storage bins 20 which is containers stored in the multi-floor storage structure 10, at least one autonomous vehicle 30 for transporting the storage bins 20, one or more picking stations 40 for picking items including products and the like contained in the storage bins 20, and a management server 50 for managing the series of work of the automated storage and retrieval system 1. At the picking station 40, a human operator 60 performs picking work of picking an item from the storage bin 20.

The multi-floor storage structure 10 includes a plurality of floors 11, each floor 11 defining a surface which extends in parallel to each other along each xy plane, and a plurality of support pillars 12 supporting the plurality of floors 11. In the present embodiment, the floors 11 of a first floor to a ninth floor vertically standing in a z-axis direction from the floor surface 101 are formed. A total height of the multi-floor storage structure 10 from the floor surface 101 in the z-axis direction can be set according to a height in the z-axis direction of the ceiling of the building 100. Note that part of the floors 11 of the eighth floor and the ninth floor is omitted for ease of description in FIG. 1, and configurations of the floors 11 of the eighth floor and the ninth floor are configured similar to the floor 11 of the seventh floor.

Figure 2:
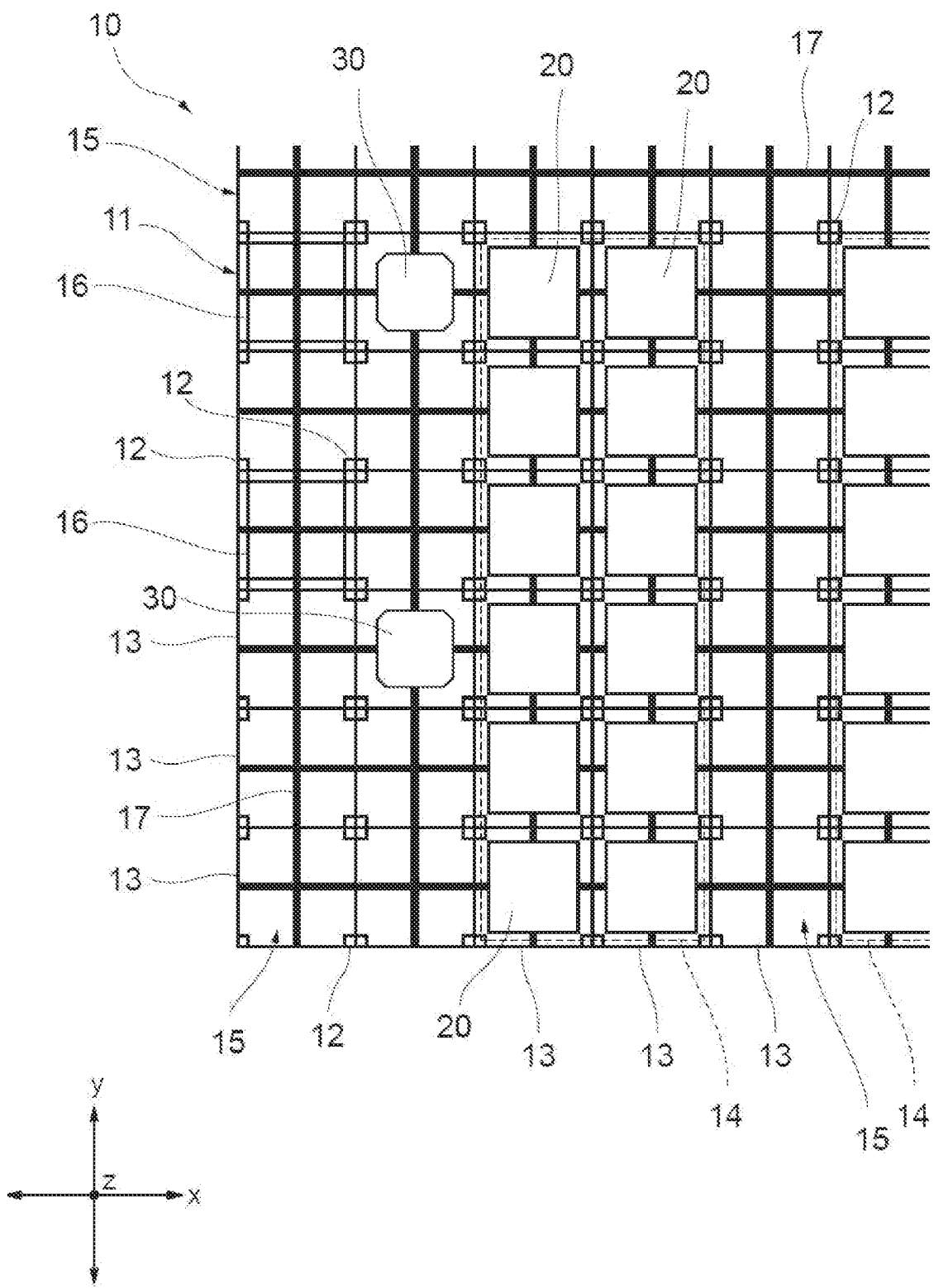
FIG. 2 is a plan view schematically illustrating an example of a structure of floors 11 of a multi-floor storage structure of the automated storage and retrieval system 1 according to the present embodiment.

FIG. 2 is a plan view schematically illustrating an example of a structure of the floor 11 of the multi-floor storage structure 10 of the automated storage and retrieval system 1 according to the present embodiment. In the present embodiment, each floor 11 of the multi-floor storage structure 10 defines a plurality of pallets 13 aligned along the xy plane. The pallets 13 defines, for example, outlines of a square or a rectangle in plan view. In the present embodiment, the support pillars 12 are respectively arranged at four corners of the one pallet 13. The one storage bin 20 occupies the one pallet 13. Similarly, the one autonomous vehicle 30 occupies the one pallet 13. That is, an outline of the storage bin 20 and an outline of the autonomous vehicle 30 are respectively arranged in the outline of the one pallet 13 in plan view. Furthermore, an interval between a pair of the mutually neighboring support pillars 12, is set larger than widths of the autonomous vehicle 30 and the storage bin 20 defined in an x axis direction and a v axis direction.

Each floor 11 defines storage areas 14 including the pallets 13 in which the storage bins 20 are aligned, and movement passages 15 of the autonomous vehicles 30 including the pallets 13 other than the storage areas 14. In the present embodiment, for example, two rows of bin groups of the plurality of storage bins 20 aligned along they axis direction are aligned in the x axis direction in the storage area 14. That is, all of the storage bins 20 making up the bin group of these two rows of the storage bins 20 face the movement passages 15 at all times. On the other hand, the autonomous vehicles 30 can run on the movement passages 15. As described later, the autonomous vehicle 30 can also run in the storage area 14, through a space below a bottom surface of the storage bin 20.

Figure 3:
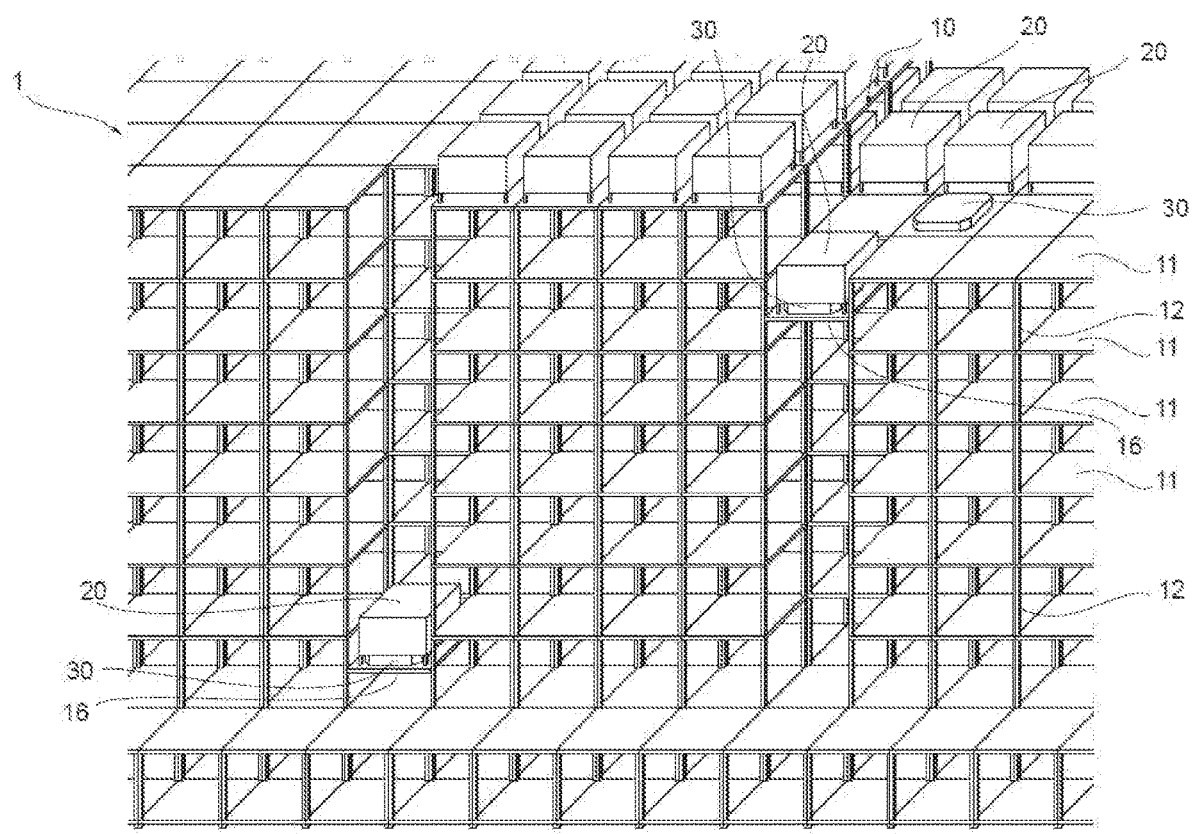
FIG. 3 is a perspective view schematically illustrating an example of a multi-storage structure of the automated storage and retrieval system 1 according to the embodiment.

FIG. 3 is a perspective schematically illustrating an example of a multi-floor storage structure 10 of the automated storage and retrieval system 1 according to the embodiment. Referring to FIGS. 1 to 3, the multi-floor storage structure 10 includes one or more vertical elevators 16. The vertical elevators 16 can make reciprocating movement in the z-axis direction from the first floor to the ninth floor of the floors 11 and may stop at each floor 11. Each vertical elevator 16 is arranged in one pallet 13 in the movement passage 15 of the autonomous vehicle 30 on each floor 11. In the present embodiment, the one or more vertical elevators 16 may be provided to the multi-floor storage structure 10. The vertical elevator 16 can have only the autonomous vehicle 30 get thereon or have the autonomous vehicle 30 holding the storage bin 20 get thereon to transport to each floor of the first floor to the ninth floor.

The vertical elevator 16 includes, for example, shafts of four corners attached to the multi-floor storage structure 10 and extend in the z axis direction, four roller chains attached to the respective shafts, and extend in the z axis direction, four sprockets meshing with the respective chains, and two electric motors (both of which are not illustrated) for respectively rotating and driving, for example, the two sprockets. The sprockets mesh with the roller chains in response to rotation of the sprockets caused by the electric motors to ascend and descend the vertical elevator 16. Note that the support pillars 12 making up the multi-floor storage structure 10 may be used in place of the shafts. The above mechanism is a mere example, and an arbitrary another mechanism realizing vertical movement of the vertical elevator 16 may be used.

Figure 4:
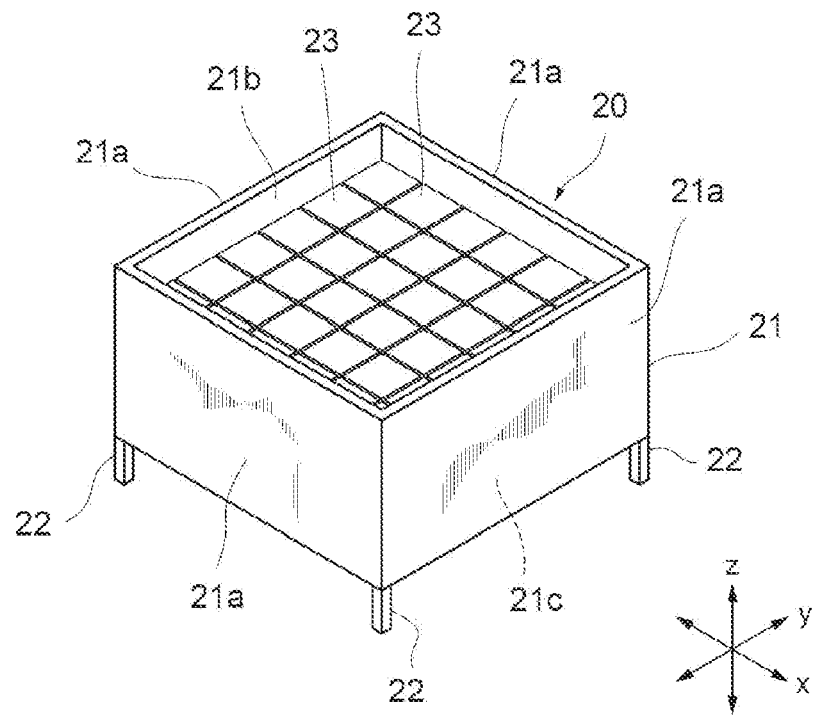
FIG. 4 schematically illustrates an example of a structure of a storage bin of the automated storage and retrieval system 1 according to the embodiment.

FIG. 4 schematically illustrates an example of the structure of the storage bin 20 of the automated storage and retrieval system 1 according to the embodiment. In the present embodiment, the storage bin 20 includes a bin main body 21 defining an internal space of, for example, a cuboid, and one or more legs 22, here four legs, extending downward from four corners of a bottom surface of the bin main body 21, The bin main body 21 has a side wall structure which includes four sidewalls 21a surrounding four sides, an opening part 21b opened along upper ends of the sidewalls 21a, and a base 21c closed along lower ends of the sidewalls 21a. Although the opening part 21b is opened in the present embodiment, the opening part 21b may be closed with, for example, a lid or a cover. The sidewalls 21a extend in parallel to, for example, the z axis. Furthermore, the base 21c extends along the xy plane. The storage bin 20 is received on the floor 11 by the one or more legs 22. The storage bin 20 may be formed by, for example, a resin material. Furthermore, the storage bin 20 may be a foldable bin. An outline of the bin main body 21 in plan view is defined as a square or a rectangle. A size of the storage bin 20 is preferably set appropriately based on a size of the multi-floor storage structure 10 or each floor 11 or a size of an item 23.

The one or more items 23 are contained in the internal space in the bin main body 21. The item 23 can be identified by, for example, a unique Stock Keeping Unit (SKU) set to the item 23. Although the item 23 is, for example, one unit of a product or the like, the item 23 may be a so-called case product packaged in a unit of a plurality of identical products. Furthermore, the one storage bin 20 may contain only the items 23 of one type or may contain the items 23 of a plurality of types. The storage bin 20 can be identified based on a unique ID set to each storage bin 20. The unique ID of this storage bin 20 is managed in correspondence with the SKU of the item 23 contained in the storage bin 20.

Figure 5:
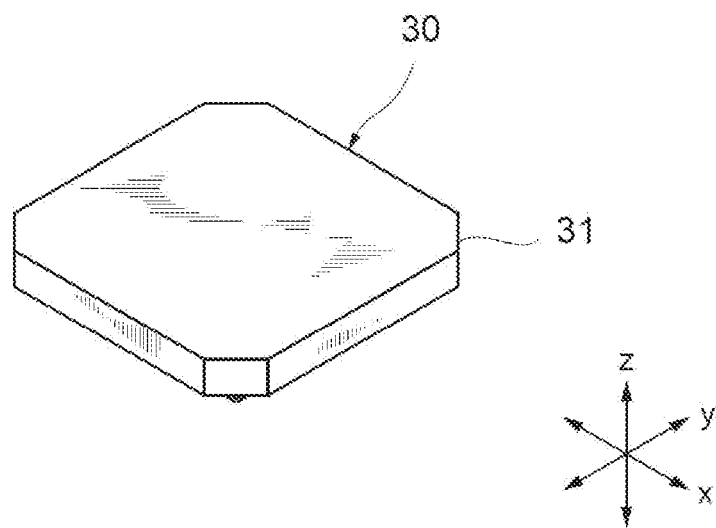
FIG. 5 is a perspective view schematically illustrating an external appearance of a transportation robot of the automated storage and retrieval system 1 according to the embodiment.

FIG. 5 is a perspective view schematically illustrating an external appearance of the autonomous vehicle 30 of the automated storage and retrieval system 1 according to the embodiment. In the present embodiment, a plurality of the autonomous vehicles 30 are arranged on each floor 11 of the multi-floor storage structure 10. The autonomous vehicle 30 is, for example, an autonomous running transportation robot including a thin housing 31 of a substantially cuboid shape. The housing 31 is formed by, for example, a resin material.

The autonomous vehicle 30 can run along a line 17 (see, for example, FIG. 2) by tracing the line 17 drawn on the floor 11 of the multi-floor storage structure 10 (line tracing function). The line 17 is two strips of lines. The two strips of lines extend passing center positions of the x axis direction and the y axis direction in, for example, each section 13, and are perpendicular to each other at a center of the section 13. These lines 17 are drawn in all of the sections 13 including the storage areas 14, the movement passages 15, and the vertical elevators 16 of the floor 11.

An upper surface of the housing 31 of the autonomous vehicle 30 extends flat along the xy plane. A height of the autonomous vehicle 30 is set smaller than the height of the one or more legs 22 of the storage bin 20. Furthermore, an outline of the housing 31 in top view is defined substantially as, for example, a square. Similarly, the length of one side of the autonomous vehicle 30 is set smaller than the length of each side of the storage bin 20. That is, the autonomous vehicle 30 can enter the space below the bin main body 21 from between the pair of mutually neighboring one or more legs 22 of the storage bin 20. In this regard, the size of the autonomous vehicle 30 is preferably set appropriately based on sizes of the multi-floor storage structure 10, each floor 11, and the storage bin 20.

Figure 6:
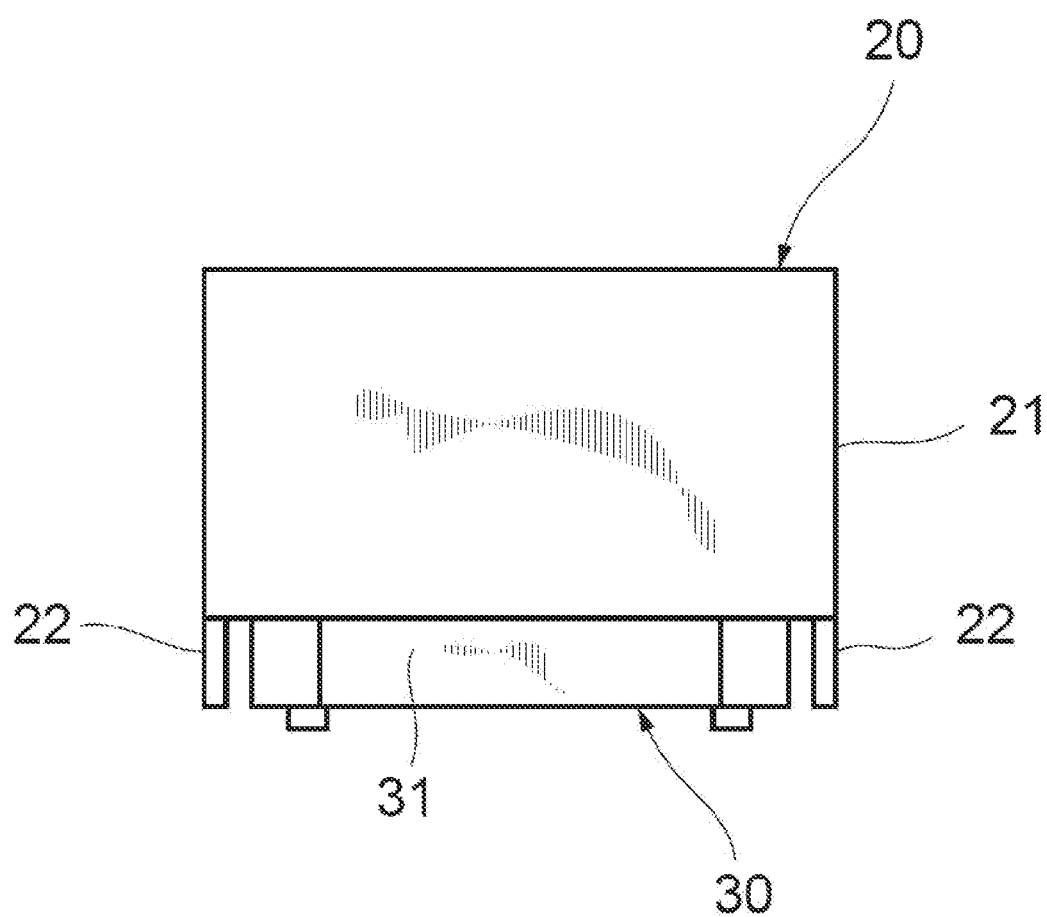
FIG. 6 is a side view illustrating a state where the transportation robot of the automated storage and retrieval system 1 according to the embodiment lifts the storage bin.

The autonomous vehicle 30 can change the height thereof between a first configuration where the height of the upper surface of the housing 31 is set to a first height, and a second configuration where the height is set to a second height higher than the first height. As described above, the autonomous vehicle 30 of the first configuration can enter the space below the bin main body 21 from between the pair of mutually neighboring one or more legs 22 of the storage bin 20. In this case, when the autonomous vehicle 30 changes the height of the housing 31 from the first configuration to the second configuration, the autonomous vehicle 30 holds the storage bin 20 on the upper surface of the housing 31 as illustrated in FIG. 6. As a result, the storage bin 20 can be lifted from the floor 11. The autonomous vehicle 30 can run in both of the first configuration and the second configuration. That is, the autonomous vehicle 30 can run on the floor 11 while lifting the storage bin 20.

Figure 7A:
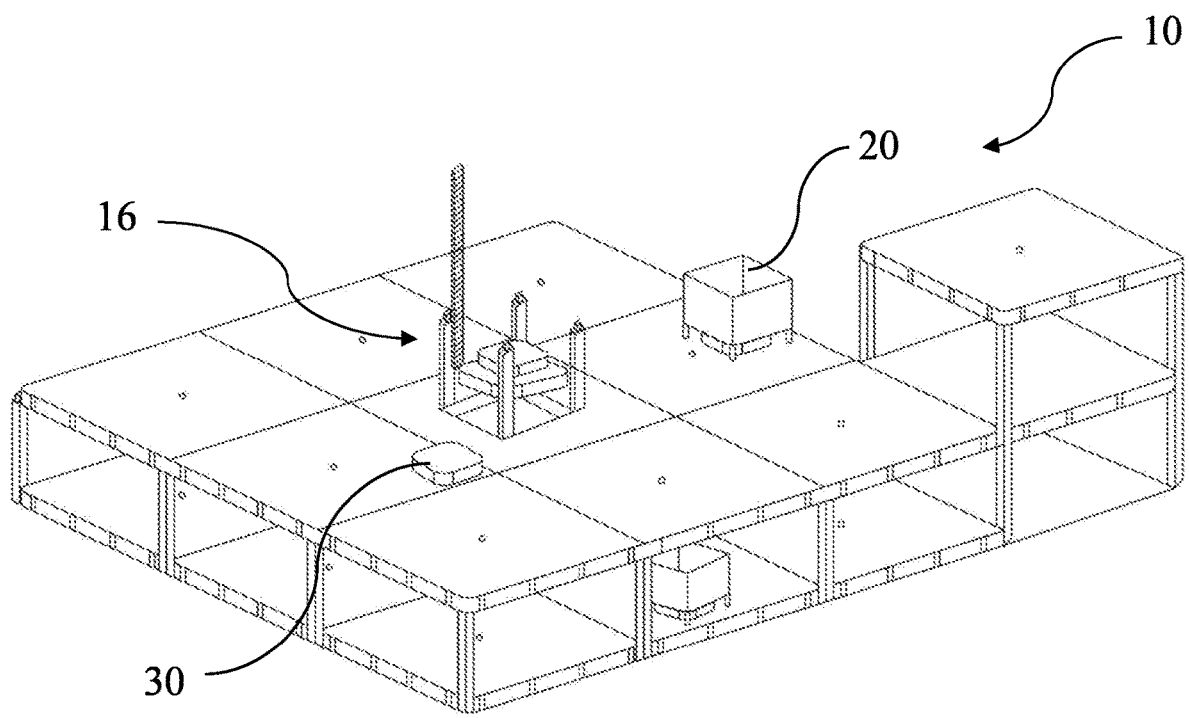
FIGS. 7A-7B is an expanded view of the multi-floor storage structure, in accordance with some embodiments of the present disclosure.

FIG. 7A is a perspective view of a portion of the multi-floor storage structure 10, in accordance with some embodiments of the present disclosure. As shown in FIG. 7A, the multi-floor storage structure 10 includes a plurality of storage bins 20 used for operating, namely, transporting, storing and retrieving items/objects in the automated storage and retrieval system 1. One or more autonomous vehicles, namely, robot 30 may be used to carry the four-legged storage bin 20 containing inventory to and from the warehouse. As shown in FIG. 7A, in an example embodiment, a two-level storage structure containing a plurality of four-legged storage bins 20 are used to transport, retrieve and store the inventory. Two level storage unit is built along pallets 13 arranged in one or more variations. Some portion of the floors may be fully packed and allow autonomous vehicle or robots 30 to move storage bins 20 to retrieve other storage bins 20 while other floors may allow direct access to storage bins 20. The autonomous vehicles 30 are able to move in the 2D space on each floor of the multi-floor storage structure 10 and external to the multi-floor structure 10, use the elevator 16, and move in the 3D space climbing each floor of the multi-floor storage structure 10. Some floors may be divided into storage space such that the elevator 16 may not necessarily be required to go to the complete full length of the multi-floor storage structure 10. For example, there may be fast-moving autonomous vehicles or robots 30 on the lower floors. The robots 30 not carrying any storage bins 20 will be moving very fast having more freedom for deviation, e.g. highways were storage bins 20 are not placed. In an embodiment, the bottom floor may have gaps between every two items and have a sufficient spacing for autonomous vehicles or robots 30 to move around at a high speed. The robot 30 may be configured to go under the bins 20 and pick them and bring them to the station. However, in top floor, because of the tight packing, the robots 30 may not be able to go below the bins 20 since there might be other bins 20 blocking the way. The autonomous vehicles or robots 30 then goes below the bins 20 that are blocking and move them from the path till the robot 30 reaches the required bin 20. Once the required bin 20 is found, the robot 30 goes underneath the bin 20 and brings it out of the packed region. The remaining bins 20 are then moved back into the vacant spaces in the same positions.

In one variation, the pallets 13 may be rectangle pallets that may include a locking mechanism, where each of the pallets is locked with another pallet 13 to create a large horizontal surface as shown in the FIG. 7A. The pallets 13 forming the horizontal surface is supported by vertical poles/elevators 16 to move the one or more autonomous vehicles 30. The pallets 13 include wedge shaped holes designed to accurately place the storage bin 20 thereby preventing the storage bins 20 from moving due to any external forces, for example, during an earthquake. In one embodiment, the multi-floor storage structure 10 may include any appropriate combination of hardware and/or software suitable to provide the described functionality. One or more different patterns of the multi-level structure is further described with reference to subsequent figures.

Embodiments of the present disclosure provide an improved volume utilization in a warehouse. Herein, the volume utilization is calculated using the following equation (1)

$$\text{Volume utilization} = (\text{bin-height-to-robot height}) \times (\text{elevator-volume}) \times (\text{space-utilization in each floor}) \times (\text{extra-space } 80\%) \quad (1)$$

Herein, extra space is for buffer between the storage bins 20 while moving, floor thickness and lifting height. In an example embodiment, bin-height-to-robot-height, for example, 50 L of a bin with dimensions 521*364*305 and an autonomous vehicle 30 height: 100 mm implied 305/305+100~0.75%.

Figure 7B:
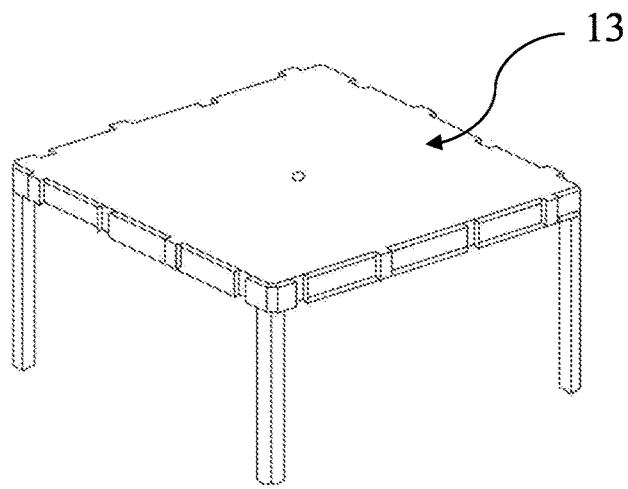

As shown in FIG. 7B, the pallet 13 is a four-legged structure used in one or more combinations to unit a warehouse structure.

Figure 8A:
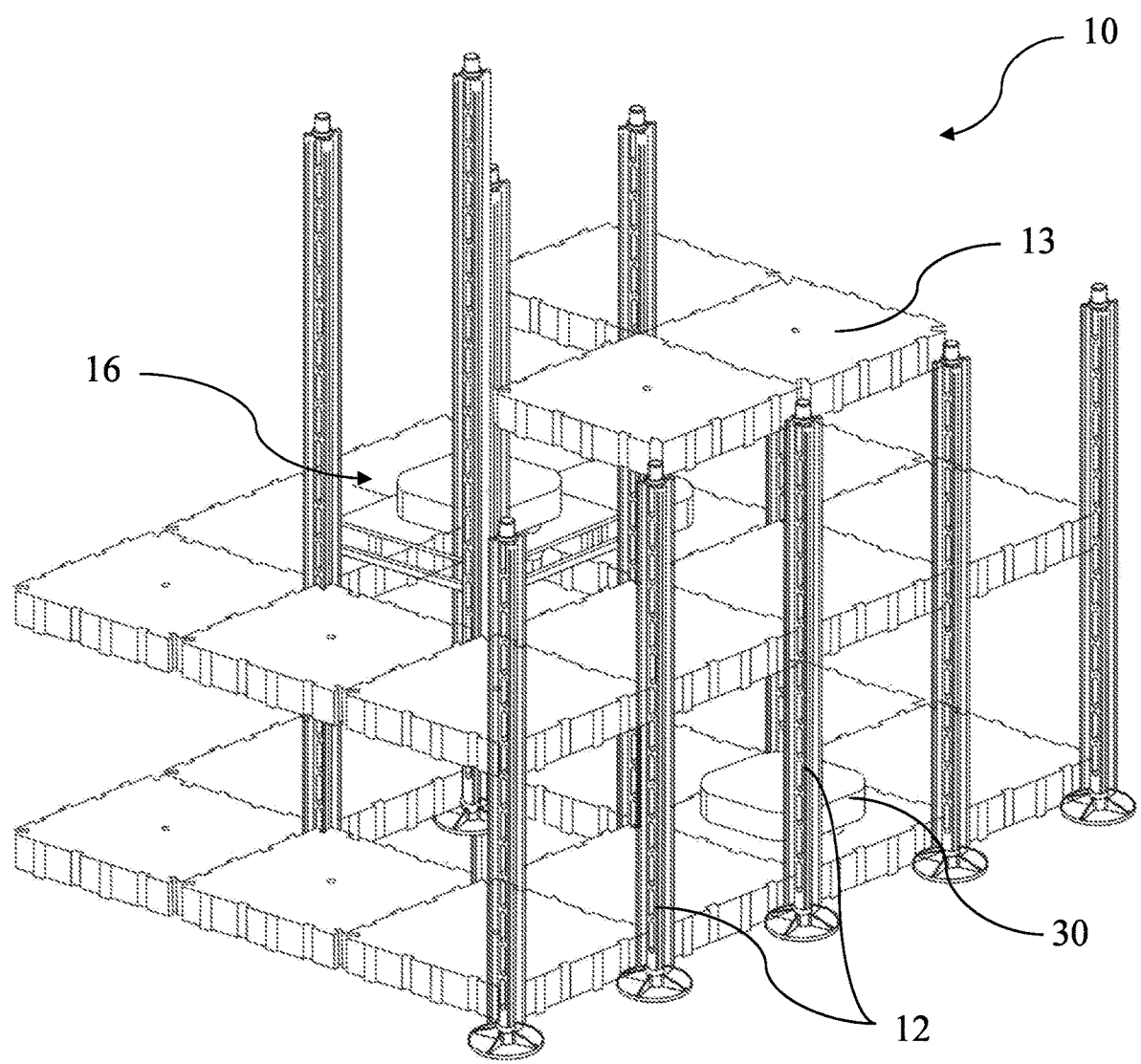
FIG. 8A is a perspective view of the multi-floor storage structure with multiple floors, in accordance with some embodiments of the present disclosure.

FIG. 8A is a perspective view of the multi-floor storage structure 10 with multiple floors, in accordance with some embodiments of the present disclosure. In this example, a three-level structure is shown. The autonomous vehicle 30 or robots are carried along the y-axis to each floor via the vertical elevator 16. There are openings defined for the vertical elevator 16 to be accommodated and move along the vertical y-axis. In one embodiment, there are multiple openings to facilitate multiple vertical elevators 16 to move and carry the autonomous vehicles 30 to multiple floors. The vertical elevators 16 may have variable lengths depending on the requirements of the multi-floor storage structure 10. The pallets 13 as discussed in FIG. 1 forms the horizontal surface at each floor. The pallets 13 are designed to rigidly attach to each other and easily moved to create one or more variations of multi-floor storage structure 10.

Figure 8B:
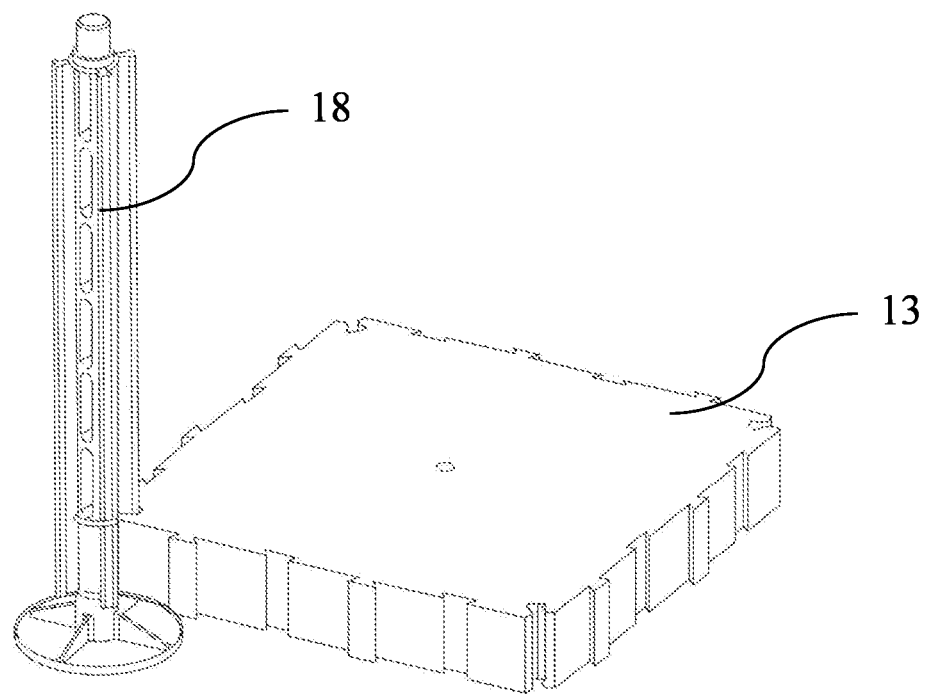
FIG. 8B is an expanded view of a pallet in the multi-floor storage structure, in accordance with some embodiments of the present disclosure.

As shown in FIG. 8B, the vertical elevator 16 includes a pallet 13 or plate slidably connected to the support pillar 18 in one or more variations. The support pillar 18 is further described with reference to FIG. 8C.

Figure 8C:
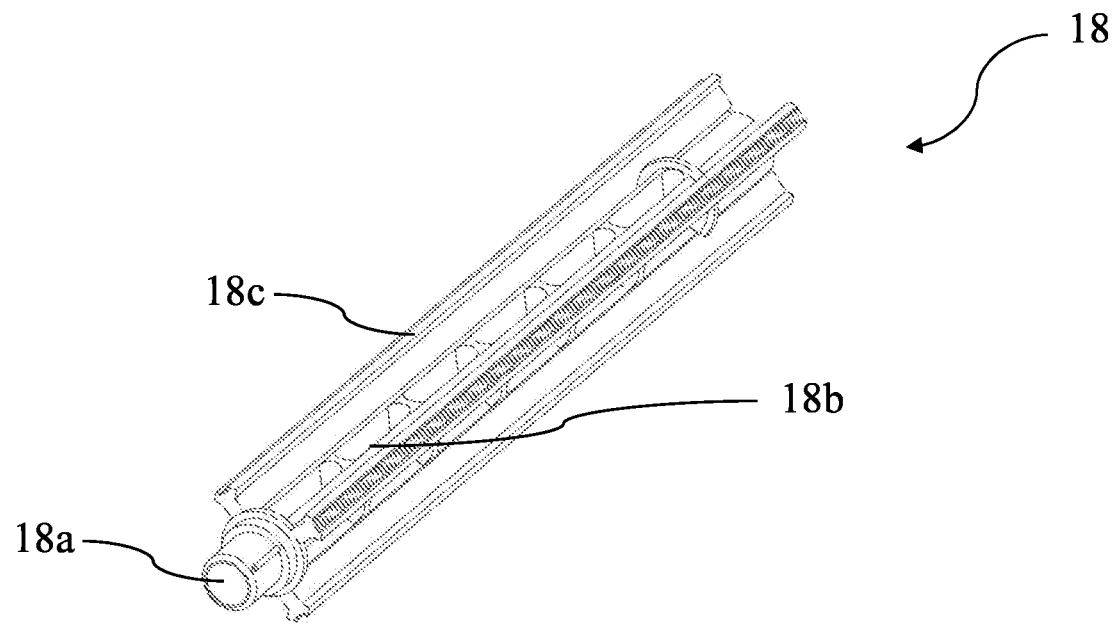
FIG. 8C is an expanded view of a vertical elevator in the multi-floor storage structure, in accordance with some embodiments of the present disclosure.

FIG. 8C is an expanded view of the support pillar 18, in accordance with some embodiments of the present disclosure. The support pillar 18 includes an elongated member 18b with radially extended ridges 18c. In an example embodiment, the ridges 18c may include a wing shaped structure to lock in with the pallets 13. In another embodiment, the ridges 18c may be differently shaped to be in agreement with the one or more variations of the pallets design.

Figure 8D:
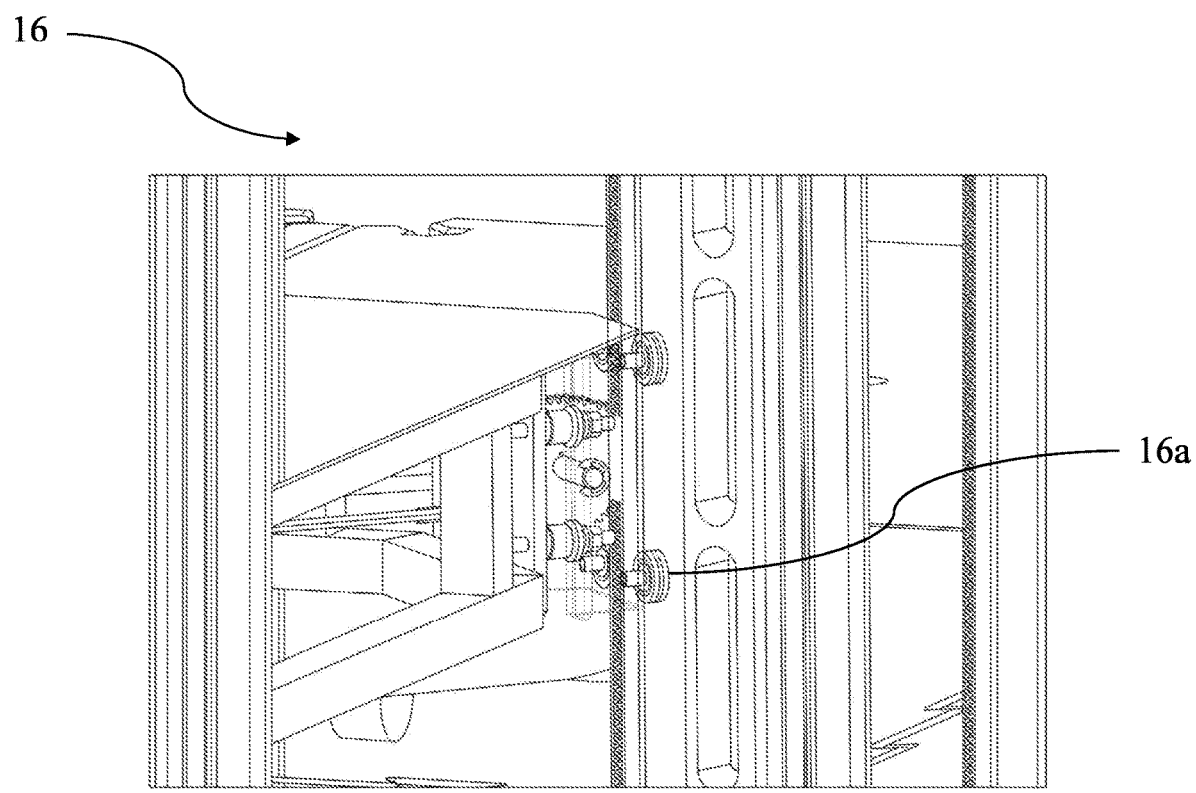
FIG. 8D is an expanded view of the vertical elevator in operation in the multi-floor storage structure, in accordance with some embodiments of the present disclosure.

FIG. 8D is an expanded view of the vertical elevator 16 in operation, in accordance with some embodiments of the present disclosure. As shown in the FIG. 8D, the support pillar 18 includes ridges 18c to support vertical movement of the autonomous vehicle 30. The ridges 18c include wheels 16a along the axis for the vertical movement of the autonomous vehicle 30 as shown in the FIG. 8D.

Figure 9A:
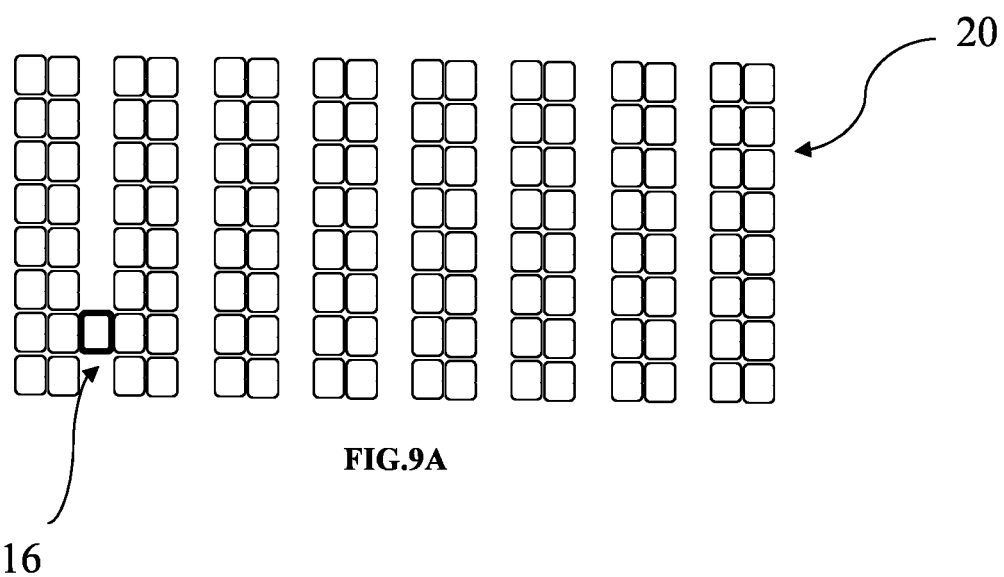
FIG. 9A-9B are schematic representation of an automated storage and retrieval system with one or more patterns, in accordance with some embodiments of the present disclosure.
Figure 9B:
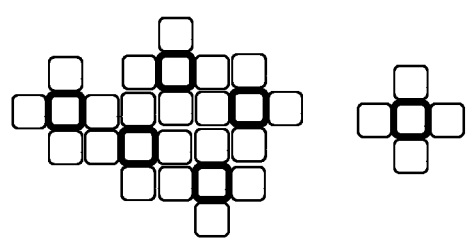

FIG. 9A-9B are schematic representations of a automated storage and retrieval system 1 with one or more patterns, in accordance with some embodiments of the present disclosure. As shown in FIG. 7A, each floor has two rows of bins 20 and one empty space for the vertical elevator 16, and for free motion of autonomous vehicles 30. Herein, the vertical elevators 16 are placed in between the empty spaces thereby maximizing the space utilization. Also, the pick location may be placed in any arbitrary location. This pattern arrangement leads to better floor occupancy. In an alternative embodiment for a 3 to 4 floor setup, the elevators may be completely eliminated. Alternatively, an optional step-structure may be provided for pickers to pick from robots arriving at the edges of higher floors. As shown in FIG. 9B, a plurality of bins 20 is placed around vertical elevator 16 creating a unit pattern. The pattern may be repeated individually or in combination with other patterns, that may lead to further improvement in floor occupancy. The disclosure provides usage of one or more patterns to get an optimal floor occupancy, considering parameters like accessibility of bins. The ASRS structure based on such patterns may not necessarily require the robots to go below the storage bins 20 but may provide mechanisms to pick front and back. In such scenarios, the system 1 may advantageously use a better height requirement that necessarily avoids the need for the autonomous vehicle 30 to go below the storage bins 20. In an example structure of FIG. 9B, the volume utilization using the aforementioned equation is calculated as follows $$\text{Volume utilization} = 0.75 \times 0.66 \times 0.8 \sim 40\%$$

Embodiments of the present disclosure also provide one or more solutions to reduce picking area and increase volume utilization in an ASRS system. For example, autonomous vehicles, like robots transporting, retrieving and storing the inventory using a plurality of storage bins may be designed to move to any arbitrary location in any floor of a warehouse. The floor itself may be considered as an area where the autonomous vehicle may serve the bins to humans on that floor. In one embodiment, pickers at a picking location in a warehouse may be positioned close to the ASRS system. In another embodiment, the pickers and the autonomous vehicle may include a facility to interact at the lower floors of the warehouse, for example, the edges of the floors may be used as a pick station. The advantage with this solution is that the autonomous vehicle need not leave the structure. The facility to interact at the lower floors may significantly reduce the picking area and thereby increase the volume utilization. In an example, multiple dimensions of items may be picked up based on the height of a floor in the warehouse. Furthermore, the floors above the pickers may be extended to increase storage, again thereby increasing the overall volume utilization. In an alternative embodiment, the present system can also be used in smaller warehouses such as micro fulfillment centers. Further, the present system may be adaptable to any arbitrary 3D space as well as the items/objects may be delivered to any arbitrary surface point of the 3D space.

Embodiments of the present disclosure provide an architecture for ASRS where a conveyor belt system may be implemented by bringing in Stock-Keeping Unit (SKU) to a picker at an order or pick/drop station at a multi-level store house. In another embodiment, a single order with two or more SKUs may be associated with multiple pickers. For example, a single order containing sku_a and sku_b may be pick-dropped at different pick stations. The present system provides flexibility of associating a single order with multiple pickers.

In an example embodiment, ASRS structure may include a plurality of bins, one or more autonomous vehicles such as robots operating in an environment, for example, a multi-level warehouse. In this example, occupancy of the ASRS structure in a x, y and z axis may be as shown below $$b\_x = 500 \, b\_y = 500 \times b\_z = 400 \, 100L(\text{occupancy})$$

In an alternative embodiment, thickness in z direction may be reduced to accommodate buffer for floor thickness, lifting height (z direction) and side buffer (x, y direction) between a plurality of moving bins. In another alternative embodiment, maximum weight of a bin and inventory (bin carrying the inventory) may be around 30 kg with an autonomous vehicle weight around 15 kgs and height 100 mm. In this example, the total weight may be around Total autonomous vehicle height+bin height~500 mm Total autonomous vehicle weight+bin weight=48 kg~50 kg Floor max load—200 kg/m2.

The aforementioned total weight includes the weight of an autonomous vehicle. In the present example, since the number of robots is less than the number of items, on average only the bin weights i.e., ~140 kg is considered. Furthermore, in an example, an autonomous vehicle may be of 100 mm height and width of 350-400 mm, a payload of 30-50 kg and a speed of 4 m/s. For example, assuming a single floor is made up of panels dimensions of p_x>p_y>>p_z (thickness).

In one embodiment, the structure may be made of steel or plywood or plastic. In another embodiment, the structure may be made of modular plastic structure. In one embodiment, there is no restriction of the pickers to be at a particular station of the warehouse. The pickers may be given locations at any location within the ASRS structure, for example, outside of the structure. The autonomous vehicle then may move the bins to the pickers located at the outside of the structure. For example, the autonomous vehicles may be underground and the pickers may be on multiple floors above the ground. In such scenarios, the autonomous vehicles may come to the pickers and deliver the picking units. This leads to savings both from cost and storage point of view for the warehouse owner.

Embodiments of the present disclosure also provide one or more technical solutions for the conventionally known problems in the art. For example, the present disclosure provides an ASRS architecture including a plurality of four-legged storage bins containing the inventory/goods/objects to be retrieved, transported and stored. The system further includes ASRS architecture designed to operate in one or more environments, for example, in a multi-floor structure where a plurality of bins is arranged. Embodiments of the present disclosure provides a plurality of autonomous vehicles, like robots, to move in and out under the plurality of bins. The system further includes vertical elevators to transport the one or more autonomous vehicle with/without the plurality of bins across multi-floors structure. The present disclosure further provides an automated picking or teleoperated picking and dropping of the goods at the picking station. The picking station may be designed at any place within the fulfillment center, including within the ASRS architecture. The ASRS in accordance with present embodiments may be implemented either as stand-alone units or in integrated workstations or systems. These units are usually integrated with various types of systems, for example pick to light systems and use either a microprocessor controller for basic usage or inventory management software.

Embodiments of the present disclosure provide an improved speed of operation in an ASRS architecture with reduced cost. For example, by splitting the vertical and horizontal motions of an autonomous vehicle carrying a bin, each mechanism of transportation, storage and retrieval is simplified and with greater speed and reduced cost. Embodiments of the present disclosure provide a ASRS structure with multi-floors structure with one or more elevators. Herein, elevator poles may be used as pillars supporting the floors to optimize volume utilization. Further, embodiments of the present disclosure allows the picker to be moved close to the wall of the ASRS structure and command the robots to bring the bins on the same floor in the same area.

In the preceding description, various aspects of an autonomous vehicle based storage and retrieval systems, according to the present disclosure have been described with reference to illustrative embodiment. However, this description is not intended to be construed in a limiting sense. Various modifications and variations of the illustrative embodiment, as well as other embodiments of the system, which are apparent to persons skilled in the art, are deemed to lie within the scope of the present disclosure.

According to some embodiments, and actual implementations may include one or more components arranged in other manners. Other topologies may be used in conjunction with other embodiments. Moreover, each component or device described herein may be implemented by any number of devices in communication via any number of other public and/or private networks. Two or more of such computing devices may be located remotely from one another and may communicate with one another via any known manner of protocol(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code read from one or more of non-transitory computer-readable media, such as a floppy disk, a CD-ROM, a DVD-ROM, a Flash drive, a magnetic tape, and solid-state Random-Access Memory (RAM) or Read Only Memory (ROM) storage units and then stored in a compressed, non-compiled and/or encrypted format. In some embodiments, hard-wired circuitry may be used in place of, or in combination with, program code for implementation of processes according to some embodiments. Embodiments are therefore not limited to any specific combination of hardware and software.

In an implementation, one or more of the method(s) described herein may be implemented at least in part as instructions embodied in a non-transitory computer-readable medium and executable by one or more computing devices. In general, a processor (for example a microprocessor) receives instructions, from a non-transitory computer-readable medium, for example, a memory, and executes those instructions, thereby performing one or more method(s), including one or more of the method(s) described herein. Such instructions may be stored and/or transmitted using any of a variety of known computer-readable media.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims (when included in the specification), the singular forms "a," "an," and "the" include plural references unless the context clearly dictates otherwise.

It is intended that the disclosure and examples be considered as exemplary only, those in the art will recognize other embodiments may be practiced with modifications and alterations to that described above.

The invention claimed is:
1. An automated storage and retrieval system, the system comprising:
    a multi-floor storage structure defined with a storage space in each floor of the multi-floor storage structure;
    a plurality of storage bins arranged in the storage space, each storage bin of the plurality of storage bins is defined with:
        a base;
        a side wall structure extending upwardly from the base; and one or more legs extending downwardly from the base such that the base is elevated from the floor, wherein each storage bin of the plurality of storage bins is configured to store inventory;

at least one autonomous vehicle configured to move under and transport the at least one storage bin of the plurality of storage bins and is configured to transport the plurality of storage bins within each floor and across multiple floors of the multi-floor storage structure.

2. The system as claimed in claim 1 comprises one or more vertical elevators installed in the multi-floor storage structure and is configured to transport the at least one autonomous vehicle with or without the plurality of storage bins vertically across the multiple floors.

3. The system as claimed in claim 2, wherein each floor of the multi-floor storage structure is defined with at least one opening and the one or more vertical elevators is configured to traverse through the at least one opening.

4. The system as claimed in claim 2, wherein each of the one or more vertical elevators comprises:
   a plate slidably connected to a plurality of support pillars; and
   a plurality of wheels mounted on ridges of the plurality of support pillars to facilitate vertical movement of the one or more vertical elevators.

5. The system according to claim 2, wherein each of the one or more vertical elevators is arranged in one pallet of a plurality of pallets in a movement passage of the at least one autonomous vehicle on each floor.

6. The system as claimed in claim 1, wherein the side wall structure and the base define an internal volume to store the inventory.

7. The system as claimed in claim 1, wherein each floor of the multi-floor storage structure is built with a plurality of pallets adjoined to each other.

8. The system as claimed in claim 7 comprises a plurality of support pillars configured to support the plurality of pallets.

9. The system as claimed in claim 8, wherein each of the plurality of support pillars comprises:
   a foot; and
   an elongated member extending upwardly from the foot and supporting the plurality of pallets across the multiple floors of the multi-floor storage structure.

10. The system as claimed in claim 9, wherein the elongated member of each of the plurality of support pillars are defined with ridges to connect with the plurality of pallets.

11. The system as claimed in claim 9, wherein each pallet of the plurality of pallets is supported by the plurality of support pillars along corners of the pallet.

12. The system according to claim 1, wherein length of at least one side of the at least one autonomous vehicle is smaller than length of each side of the storage bin.

13. The system according to claim 1, wherein the at least one autonomous vehicle can run along a line by tracing the line drawn on the floor of the rack.

14. The system according to claim 1, wherein the at least one autonomous vehicle is configured to change its height between a first configuration in which an upper surface of a housing is set to a first height, and a second configuration in which the upper surface of the housing is set to a second height higher than the first height.

15. The system according to claim 1, wherein each of the plurality of floors defines a storage area having storage bins facing a movement passage, the autonomous vehicle configured to run in the storage area and the movement passage.

16. The system according to claim 15, wherein the autonomous vehicle configured to run in the storage area and a space below the storage bin.

17. The system according to claim 1, wherein the inventory is identified by a unique stock keeping unit set to an item.

18. The system according to claim 1, wherein the storage bin is identified based on a unique ID managed in correspondence with a stock keeping unit set to each storage bin.

19. A method for handling inventory in an automatic storage and retrieval system, the method comprising:
   storing inventory in a plurality of storge bins arranged in a storage space defined in each floor of a multi-floor storage structure, a plurality of storage bins arranged in the storage space, each storage bin of the plurality of storage bins is defined with:
   a base;
   a side wall structure extending upwardly from the base; and
   one or more legs extending downwardly from the base such that the base is elevated from the floor, wherein each storage bin of the plurality of storage bins is configured to store inventory;
   transporting the plurality of storage bins within each floor and across multiple floors of the multi-floor storage structure by at least one autonomous vehicle, wherein at least one autonomous vehicle is configured to move under and transport the at least one storage bin of the plurality of storage bins.

20. The method as claimed in claim 19, comprising traversing vertically the at least one autonomous vehicle with or without the plurality of storage bins across the multiple floors by one or more vertical elevators.

* * * * *